United States Patent [19]

Ansari et al.

[11] Patent Number: 5,703,583
[45] Date of Patent: Dec. 30, 1997

[54] METHOD AND APPARATUS FOR SAMPLING QUADRATURE SIGNALS

[75] Inventors: Adil Ansari; Zhaohong Zhang, both of Kokomo, Ind.

[73] Assignee: Delco Electronics Corporation, Kokomo, Ind.

[21] Appl. No.: 550,322

[22] Filed: Oct. 30, 1995

[51] Int. Cl.$^6$ .................................................. H03M 1/00
[52] U.S. Cl. ........................................ 341/122; 341/155
[58] Field of Search ................................ 341/122, 155, 341/141

[56] References Cited

U.S. PATENT DOCUMENTS

| | | | |
|---|---|---|---|
| 4,117,409 | 9/1978 | O'Brien | 328/151 |
| 5,045,777 | 9/1991 | Itagaki | 324/77 R |
| 5,293,114 | 3/1994 | McCormick et al. | 324/76.22 |
| 5,323,103 | 6/1994 | Choate et al. | 324/76.22 |

OTHER PUBLICATIONS

Evans et al., "Basic Electronics Technology," Texas Instruments Information Publishing Center, pp. 332–333, 1985.

TMS34010 User's Guide, Texas Instruments, Inc., pp. 10–1 to 10–19, 1986.

*Primary Examiner*—Marc S. Hoff
*Attorney, Agent, or Firm*—Mark A. Navarre

[57] ABSTRACT

Each signal channel has a 12 bit A/D converter which begins conversion after each read cycle. A 24 bit digital signal processor is connected by a 24 bit data bus to the converters such that one converter supplies data to the upper data lines and the other supplies data to the lower data lines of the bus. Both converters are simultaneously read into the processor, the data being combined into one word. The processor then splits the word into separate data for each channel by multiply and move operations.

8 Claims, 1 Drawing Sheet

METHOD AND APPARATUS FOR SAMPLING QUADRATURE SIGNALS

FIELD OF THE INVENTION

This invention relates to signal processing and particularly to a method and apparatus for simultaneous digital sampling of a pair of signals.

BACKGROUND OF THE INVENTION

In radar applications, quadrature signals are often required to provide unambiguous Doppler information. These signals must be sampled within 50–100 nsecs of each other in order to maintain data integrity.

A conventional method of obtaining simultaneous signals from separate channels is to use two sample-and-hold devices to sample both channels simultaneously. The input of an analog-to-digital (A/D) converter is switched between the two devices by a multiplexer. The speed of the A/D converter has to be more than two times the required sampling rate of each channel. The quality of data is totally dependent on the characteristics of the sample-and-hold devices which are very expensive for good quality. Two control signals from the signal processor are required: one to start the sampling process and the other one to switch the input of the A/D converter.

Another conventional method is to use two A/D converters. A control signal from the signal processor starts the sampling and conversion of the two signals by the converters. Then the processor reads the output of the two converters separately. A decode logic must process two addresses to carry out the read functions first for one converter and later for the other.

It is therefore an object of the invention to guarantee the simultaneous sampling of both channels of a quadrature signal while simplifying the hardware. Another object in such a sampling arrangement is to reduce software throughput time.

Two A/D converters, one for each channel, are able to start conversion at the end of a read cycle so that no control signal is required for that function. A digital signal processor (DSP) is capable of receiving both converter outputs at the same time; a bus connects the converters to the DSP. Decode logic responds to one address to select both of the converters, and a read signal is supplied by the processor to both converters.

When the DSP addresses the A/D converters via the decode logic and issues a read signal at the same time, the outputs from the two converters are sent over the bus to the DSP as one digital word. Then the converters automatically start conversion when the read signal is removed. The one word is split into first and second data for the two channels by a method which takes less processing time than reading data from a peripheral, for a net savings in processor burden.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
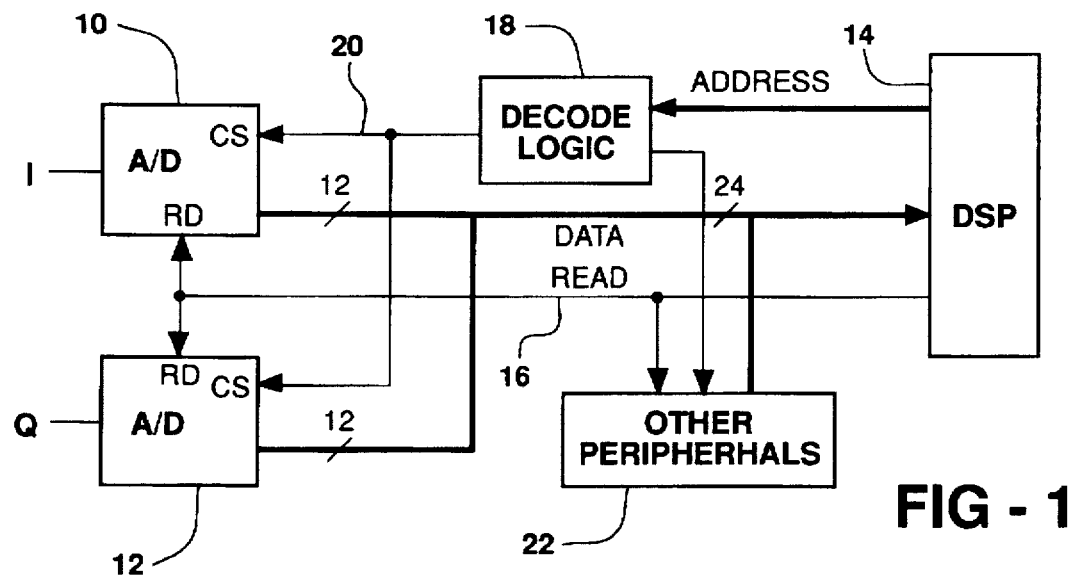
FIG. 1 is a block diagram of a circuit for simultaneously sampling quadrature signals, according to the invention.

Referring to FIG. 1, a radar data processor employs two fast 12 bit A/D converters 10 and 12 coupled to I and Q channels which comprise the quadrature signal, and a 24 bit DSP 14 such as a DSP56002 available from Motorola Semiconductor Products, Inc. Phoenix, Ariz. The DSP 14 is connected by a 24 bit data bus to both of the A/D converters 10 and 12. The bus is split into two twelve line sections such the data D1 of converter 12 is coupled to the upper data lines of the bus and the data D2 of the converter 10 is coupled to the lower data lines of the bus. A read control line 16 is connected from the DSP 14 to RD pins of both converters 10 and 12. A decode logic circuit 18 is connected to the DSP address bus and has a chip select line 20 connected to CS pins of both converters 10 and 12. Other peripherals 22 in the system are also serviced by the DSP 14 and are connected to the data bus, the read control line 16, and the decode logic.

In operation, the decode logic responds to addresses from the DSP 14 to determine which peripheral device is to be selected or enabled. The read command is effective only for the selected device. Thus when the A/D converter address is issued, the decode logic 18 selects the converters 10 and 12, and when the read command is issued the data from both converters are read into the processor by one read operation as a single 24 bit word. Therefore, the simultaneous sampling of both channels is guaranteed. As soon as the read cycle is completed, the A/D converters start another conversion.

Figure 2:
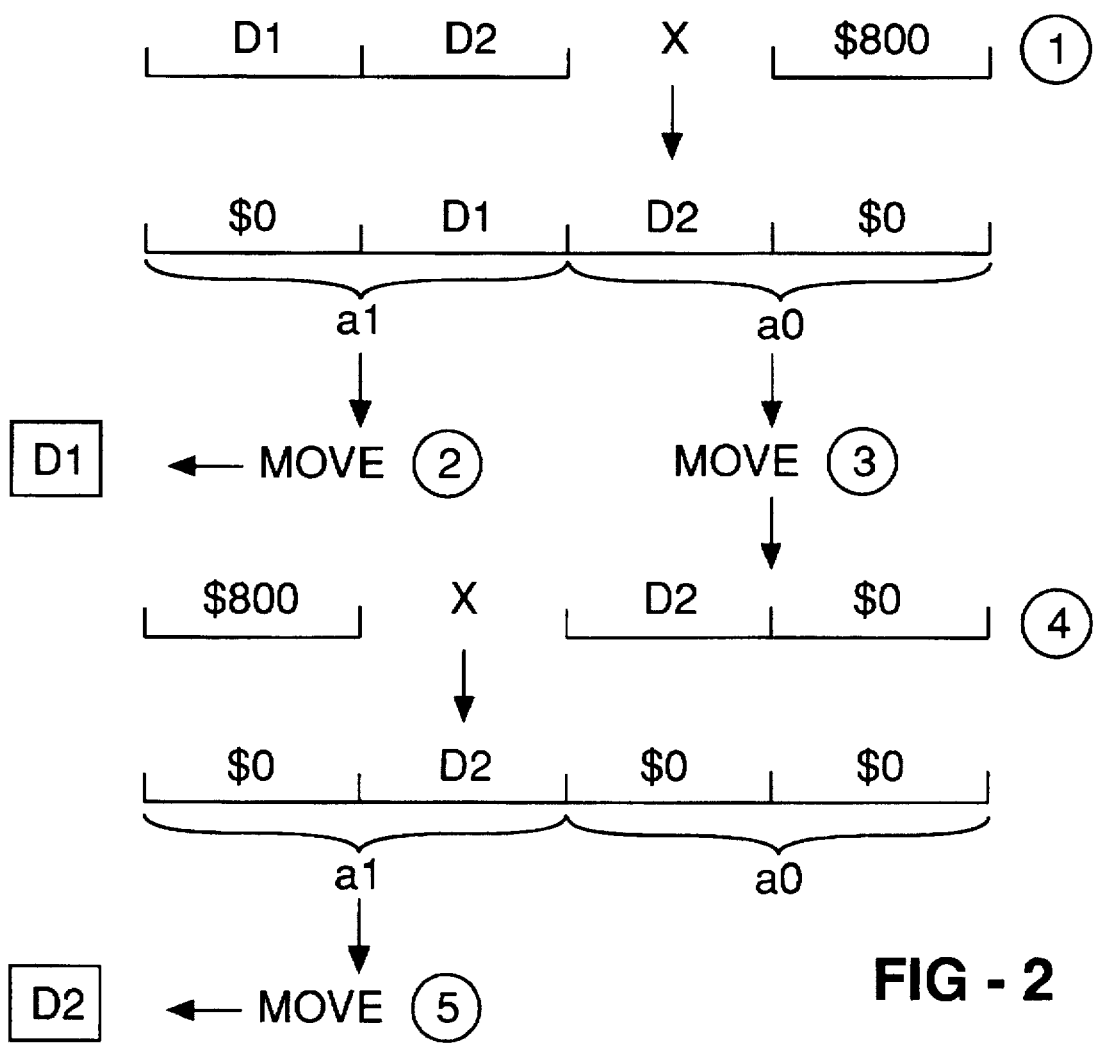
FIG. 2 is a chart illustrating a method of splitting a large digital word into two smaller words, according to the invention.

The single 24 bit word is split into the D1 and D2 components representing the Q channel data and I channel data, respectively. The method of splitting the larger word is illustrated in FIG. 2, each step being identified by a numeral in a circle. In step 1, the 24 bit word, comprising the data D1 and D2 is multiplied by $800 which has the effect of shifting each bit 12 positions to the left. The result appears in the 24 bit accumulators a0 and a1. The upper level bits representing D1 are shifted into the accumulator a1, while the lower level bits representing D2 are advanced to higher levels of accumulator a0. The accumulator a1 then contains D1, the higher 12 bits being zeros. In step 2, D1 is moved from the accumulator a1 to a register, thus isolating the Q channel data from the original 24 bit word.

The accumulator a0 has the data D2 in its upper 12 bits and the value $0 in the lower bits. In step 3 the accumulator a0 data is moved to a register, and in step 4 that data is multiplied by $800. The result is stored in the accumulators a0 and a1 with the effect that the data D2 is shifted into the lower levels of a1. In step 5, D2 is moved to a register to therefore isolate the I channel data.

The word splitting process requires two multiply operations and three move operations, but two of those move operations can be processed in parallel with other functions. Thus the net time for splitting is that required for two multiply operations (two clock cycles each) and one move operation (four clock cycles). A total of eight clock cycles are sufficient to accomplish the word splitting, whereas ten cycles are needed to read a word from an external peripheral device. Thus the proposed arrangement reduces software overhead compared to reading separate words from two A/D converters. Other reduction of processor burden results from using only one address to select both converters and only one control signal (read).

It will thus be apparent that the invention provides improved operation by assuring that the data of the two channels is sampled simultaneously, and that the apparatus is very simple and the processor efficiency is improved by reduction of software requirements.

The embodiments of the invention in which an exclusive property or privilege is claimed are defined as follows:

1. The method of simultaneously sampling quadrature signals in first and second channels comprising the steps of:

simultaneously performing analog-to-digital conversion on signals in said first and second channels to form respective first and second digital signals;

combining said first and second digital signals to form a single digital signal containing said first and second digital signals in first and second separable portions;

reading said single digital signal; and starting another conversion for said first and second channels immediately after the reading of said single digital signal.

2. The method as defined in claim 1 including the step of:

after reading the single digital signal, separating the single digital signal into first and second data representing said first and second digital signals, respectively.

3. The method as defined in claim 2 wherein the step of separating the single digital signal includes the steps of:

storing said single digital signal in a digital register;

shifting the single digital signal so as to shift the first data to a first portion of said digital register and the second data to a second portion of said digital register;

moving the first data out of the digital register;

then shifting the second data the first portion of said digital register; and moving the second data out of the digital register.

4. The method as defined in claim 1 wherein the reading step includes:

issuing an address for selecting the analog-to-digital converters; and issuing a read instruction to read the contents of the selected converters.

5. Apparatus for simultaneous sampling of quadrature signals comprising:

first and second analog-to-digital converters coupled to respective first and second signals;

a digital signal processor;

first and second data buses split at first ends thereof to receive data from the first and second analog-to-digital converters and joined at second ends thereof to form a single input to said digital signal processor; and read means for causing the digital signal processor to read data at said single input, whereby the data from said first and second analog-to-digital converters are read as a single digital word.

6. The apparatus as defined in claim 5 wherein the read means comprises:

a read line coupled from the digital signal processor to the converters for carrying a read command;

a decode logic circuit connected to the converters to select the converters; and an address bus for carrying a converter select address to the decode logic, whereby selecting the converters in conjunction with a read command initiates reading data from the converters.

7. The apparatus as defined in claim 5 wherein:

the digital signal processor is programmed to split the single digital word into two smaller digital words comprising the data of the two converters.

8. The apparatus as defined in claim 5 wherein the converters have the property of automatically starting conversion following a read mode.

* * * * *